(12) United States Patent
Cauvin et al.

(10) Patent No.: US 12,743,756 B2
(45) Date of Patent: Sep. 22, 2026

(54) INVERSE TONE MAPPING WITH ADAPTIVE BRIGHT-SPOT ATTENUATION

(71) Applicant: InterDigital CE Patent Holdings, SAS, Paris (FR)

(72) Inventors: Laurent Cauvin, Chevaigne (FR); Frederic Plissonneau, Thorigné-fouillard (FR); Guillaume Poirier, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 488 days.

(21) Appl. No.: 18/012,274

(22) PCT Filed: Jun. 4, 2021

(86) PCT No.: PCT/EP2021/064973

§ 371 (c)(1),
(2) Date: Dec. 22, 2022

(87) PCT Pub. No.: WO2021/259613

PCT Pub. Date: Dec. 30, 2021

(65) Prior Publication Data

US 2023/0267579 A1 Aug. 24, 2023

(30) Foreign Application Priority Data

Jun. 26, 2020 (EP) .................................... 20305717

(51) Int. Cl.
*G06T 5/92* (2024.01)
*G06T 5/40* (2006.01)

(52) U.S. Cl.
CPC .................. *G06T 5/92* (2024.01); *G06T 5/40* (2013.01); *G06T 2207/10016* (2013.01); *G06T 2207/20208* (2013.01)

(58) Field of Classification Search
CPC ......................... G06T 5/92; G06T 5/40; G06T 2207/10016; G06T 2207/20208; G06T 5/009;
(Continued)

(56) References Cited

U.S. PATENT DOCUMENTS 8,982,963 B2 3/2015 Gish et al.
10,510,140 B2 12/2019 Cauvin et al.
(Continued)

FOREIGN PATENT DOCUMENTS

CN 104185991 A 12/2014
CN 105745914 A 7/2016
(Continued)

OTHER PUBLICATIONS

Anonymous, “Methods for Conversion of High Dynamic Range Content to Standard Dynamic Range Content and Vice-Versa”, International Telecommunication Union (ITU), ITU-R Radiocommunication Sector of ITU, BT Series Broadcasting service (television) Report ITU-R BT.2446-0, Apr. 2019, 33 pages.
(Continued)

*Primary Examiner* — Matthew C Bella
*Assistant Examiner* — Daniel J. Santos
(74) *Attorney, Agent, or Firm* — Condo Roccia Koptiw LLP

(57) ABSTRACT

A method for inverse tone mapping by obtaining a gain function, called initial gain function, of a first inverse tone mapping function; if an analysis of a current image shows that at least a pixel of the current image with a luminance value at least equal to a luminance value depending of a predetermined percentage of the pixels of the current image have an expanded luminance value resulting from an application of the first ITM function to the current image higher than a target value, applying a second ITM function to the current image, the second ITM function corresponding to
(Continued)

the first inverse tone mapping function in which the gain function has been replaced by a modified gain function derived from the initial gain function in which a gain provided by the initial gain function is attenuated by an attenuation function, said attenuation function being weighted by a weighting factor controlling a strength of the attenuation, the weighting factor depending on a statistical distribution of luminance values in an histogram of the current image between a maximum luminance value and the luminance value depending of the predetermined percentage.

16 Claims, 10 Drawing Sheets

(58) Field of Classification Search
CPC .... G06T 5/94; G06T 5/90; G06T 5/70; G06T 5/50; G09G 5/10
USPC .......................................................... 382/169
See application file for complete search history.

(56) References Cited

U.S. PATENT DOCUMENTS 11,594,159 B2 * 2/2023 Atkins et al. .......... G09G 3/002
2014/0241418 A1 8/2014 Garbas et al.
2015/0350513 A1 12/2015 Zhang et al.
2016/0358319 A1 * 12/2016 Xu et al. ................. G06T 5/007
2016/0360212 A1 12/2016 Dai et al.
2018/0033125 A1 * 2/2018 Choudhury et al. .... G06T 5/009
2018/0115742 A1 4/2018 Guermoud et al.
2018/0211369 A1 * 7/2018 Leleannec et al. ..... G06T 5/009
2018/0232867 A1 * 8/2018 Park et al. .............. G06T 5/009
2019/0208173 A1 7/2019 Kadu et al.
2021/0358089 A1 * 11/2021 Wen et al. .............. G06T 5/002

FOREIGN PATENT DOCUMENTS

CN 109416832 A 3/2019
EP 3249605 A1 11/2017
EP 3503019 A1 * 6/2019 ............... G06T 5/00
JP 2012-520619 A 9/2012
JP 2018-110373 A 7/2018
JP 2019-008789 A 1/2019
WO WO 2015096955 A1 7/2015

OTHER PUBLICATIONS

Zhang, et al., “A Method of Traffic Sign Detection and Recognition Based on HDR Technology”, Laser & Optoelectronics Progress, Apr. 2018, 9 pages.

* cited by examiner

INVERSE TONE MAPPING WITH ADAPTIVE BRIGHT-SPOT ATTENUATION

1. TECHNICAL FIELD

At least one of the present embodiments generally relates to the field of high dynamic range imaging and in particular to a method and an apparatus for expanding a dynamic range of a low or standard dynamic range image with a specific focus on how to attenuate automatically and adaptively bright areas in a resulting high dynamic range image down to a specific target luminance.

2. BACKGROUND

Recent advancements in display technology are beginning to allow for an extended dynamic range of color, luminance and contrast in images to be displayed. The term image refers here to an image content that can be for example a video or a still picture or image.

Technologies allowing for an extended dynamic range in luminance or brightness of images are known as high dynamic range (HDR) imaging. Although a number of HDR display devices have appeared, as well as image cameras capable of capturing images with an increased dynamic range, there is still a very limited number of HDR contents available. Solutions allowing extending the dynamic range of existing contents so that these contents can be displayed efficiently on HDR display devices are needed.

To prepare conventional (hereon referred to as LDR for low dynamic range or as SDR for Standard dynamic range) content for HDR display devices, reverse or inverse tone mapping operators (ITMO or ITM) can be employed. ITMOs allow to generate HDR images from conventional (LDR or SDR) images, by using algorithms that process the luminance information of pixels in the images with the aim of recovering or recreating an appearance of a corresponding original scene. Typically, ITMOs take a conventional image as input, expand the luminance range of colors of this image in a global manner, and subsequently process highlights or bright areas (i.e. bright spots) locally to enhance an HDR appearance of colors in the image.

To enhance bright areas in an image, it is known to create a luminance expansion map (or gain function) associating each pixel of an SDR image with an expansion value to apply to the luminance of this pixel to obtain a corresponding HDR image. However, even when applying a best possible luminance gain function (and, a fortiori when applying a fixed luminance gain function not specifically adapted to said SDR image), bad grading may occur in the obtained HDR image. In particular, highlights or bright areas covering wide areas in a SDR image can result in areas that are too bright in a corresponding HDR image. Consequently, some HDR display devices are not able to display correctly such HDR images. Indeed, since these HDR images exceed their display capacity, the display devices apply a more or less efficient algorithm to reduce locally or globally the brightness of the HDR image. When not managed by the display device, large bright areas in a corresponding HDR image can dazzle the viewer or at least make its HDR viewing experience unpleasant. It is then preferable to attenuate in a controlled manner the brightness of these areas.

It is desirable to overcome the above drawbacks.

It is particularly desirable to define an inverse tone mapping method allowing attenuating automatically and adaptively bright areas down to a specific expanded target luminance.

3. BRIEF SUMMARY

In a first aspect, one or more of the present embodiments provide a method for inverse tone mapping wherein the method comprises: obtaining an image, called current image; obtaining a gain function, called initial gain function, of a first inverse tone mapping function; if an analysis of the current image shows that at least a pixel of the current image with a luminance value at least equal to a luminance value depending of a predetermined percentage of the pixels of the current image have an expanded luminance value resulting from an application of the first inverse tone mapping function to the current image higher than a target expanded luminance value, applying a second inverse tone mapping function to the current image, the second inverse tone mapping function corresponding to the first inverse tone mapping function in which the gain function has been replaced by a modified gain function; the modified gain function being a function derived from the initial gain function in which a gain provided by the initial gain function is attenuated by an attenuation function, said attenuation function being an increasing function of luminance values weighted by a weighting factor controlling a strength of the attenuation, the weighting factor depending on a statistical distribution of luminance values in an histogram of the current image between a maximum luminance value and the luminance value depending of the predetermined percentage.

In an embodiment, the method comprises: browsing the histogram in descending order of luminance values from the maximum luminance value; computing an intermediate weighting factor for each browsed luminance value while the browsed luminance value is at least equal to the luminance value depending on the predetermined percentage and on a result of an application of the first inverse tone mapping function to the browsed luminance value is at least equal to the target expanded luminance value; and, setting the value of the weighted factor to a value corresponding to a maximum of the computed intermediate weighting factor.

In an embodiment, the intermediate weighting factor depends on an intermediate expanded target luminance value, the intermediate expanded target luminance value being a weighted sum between the expanded target luminance value and the result of the application of the first inverse tone mapping function to the browsed luminance value, each weight of the weighting sum depending on a value representative of a proportion of pixels of the current image having a luminance value higher than the browsed luminance value.

In an embodiment, the value representative of the proportion of pixels of the current image having a luminance value higher than the browsed luminance value depends also on a maximum authorized expended luminance value.

In an embodiment, the method comprises applying the first inverse tone mapping function to the current image when a quantity of pixels of the current image having a luminance value higher than the browsed luminance value is lower than a predefined minimum number of pixels.

In an embodiment, the current image belongs to a video sequence and the method comprises detecting scene cuts in the current video sequence, the weighting factor controlling the strength of the attenuation depending also at least of one other weighting factor controlling the strength of the attenuation computed for another image of the video sequence preceding the current image, no scene cut having been detected between the current image and said another image.

In an embodiment, the method comprises verifying a monotonicity of a first inverse tone mapping curve obtained with the second inverse tone mapping function and modifying at least one parameter of the second inverse tone mapping function to obtain a monotonous second inverse tone mapping curve when the first inverse tone mapping curve is not monotonous.

In a second aspect, one or more of the present embodiments provide a device for inverse tone mapping wherein the device comprises electronic circuitry adapted for:

obtaining an image, called current image; obtaining a gain function, called initial gain function, of a first inverse tone mapping function; if an analysis of the current image shows that at least a pixel of the current image with a luminance value at least equal to a luminance value depending of a predetermined percentage of the pixels of the current image have an expanded luminance value resulting from an application of the first inverse tone mapping function to the current image higher than a target expanded luminance value, applying a second inverse tone mapping function to the current image, the second inverse tone mapping function corresponding to the first inverse tone mapping function in which the gain function has been replaced by a modified gain function; the modified gain function being a function derived from the initial gain function in which a gain provided by the initial gain function is attenuated by an attenuation function, said attenuation function being an increasing function of luminance values weighted by a weighting factor controlling a strength of the attenuation, the weighting factor depending on a statistical distribution of luminance values in an histogram of the current image between a maximum luminance value and the luminance value depending of the predetermined percentage.

In an embodiment, the electronic circuitry is further adapted for: browsing the histogram in descending order of luminance values from the maximum luminance value; computing an intermediate weighting factor for each browsed luminance value while the browsed luminance value is at least equal to the luminance value depending on the predetermined percentage and on a result of an application of the first inverse tone mapping function to the browsed luminance value is at least equal to the target expanded luminance value; and, setting the value of the weighted factor to a value corresponding to a maximum of the computed intermediate weighting factor.

In an embodiment, the intermediate weighting factor depends on an intermediate expanded target luminance value, the intermediate expanded target luminance value being a weighted sum between the expanded target luminance value and the result of the application of the first inverse tone mapping function to the browsed luminance value, each weight of the weighting sum depending on a value representative of a proportion of pixels of the current image having a luminance value higher than the browsed luminance value.

In an embodiment, the value representative of proportion of pixels of the current image having a luminance value higher than the browsed luminance value depends also on a maximum authorized expended luminance value.

In an embodiment, the electronic circuitry is further adapted for applying the first inverse tone mapping function to the current image when a quantity of pixels of the current image having a luminance value higher than the browsed luminance value is lower than a predefined minimum number of pixels.

In an embodiment, the current image belongs to a video sequence and the electronic circuitry is also adapted for detecting scene cuts in the current video sequence, the weighting factor controlling the strength of the attenuation depending also at least of one other weighting factor controlling the strength of the attenuation computed for another image of the video sequence preceding the current image, no scene cut having been detected between the current image and said another image.

In an embodiment, the electronic circuitry is further adapted for verifying a monotonicity of a first inverse tone mapping curve obtained with the second inverse tone mapping function and modifying at least one parameter of the second inverse tone mapping function to obtain a monotonous second inverse tone mapping curve when the first inverse tone mapping curve is not monotonous.

In a third aspect, one or more of the present embodiments provide an apparatus comprising a device according to the second aspect.

In a fourth aspect, one or more of the present embodiments provide a signal generated by the method of the first aspect or by the device of the second aspect or by the apparatus of the third aspect.

In a fifth aspect, one or more of the present embodiments provide a computer program comprising program code instructions for implementing the method according to the first aspect.

In a sixth aspect, one or more of the present embodiments provide an information storage means storing program code instructions for implementing the method according to the first aspect.

4. BRIEF SUMMARY OF THE DRAWINGS

Figure 12A:
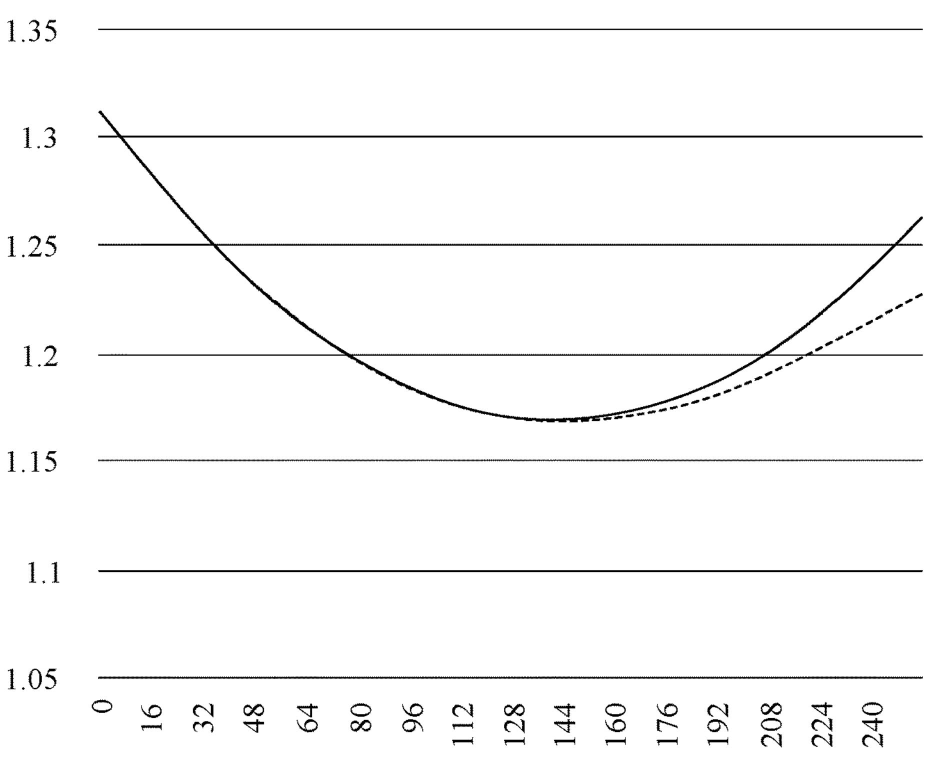
Figure 12B:
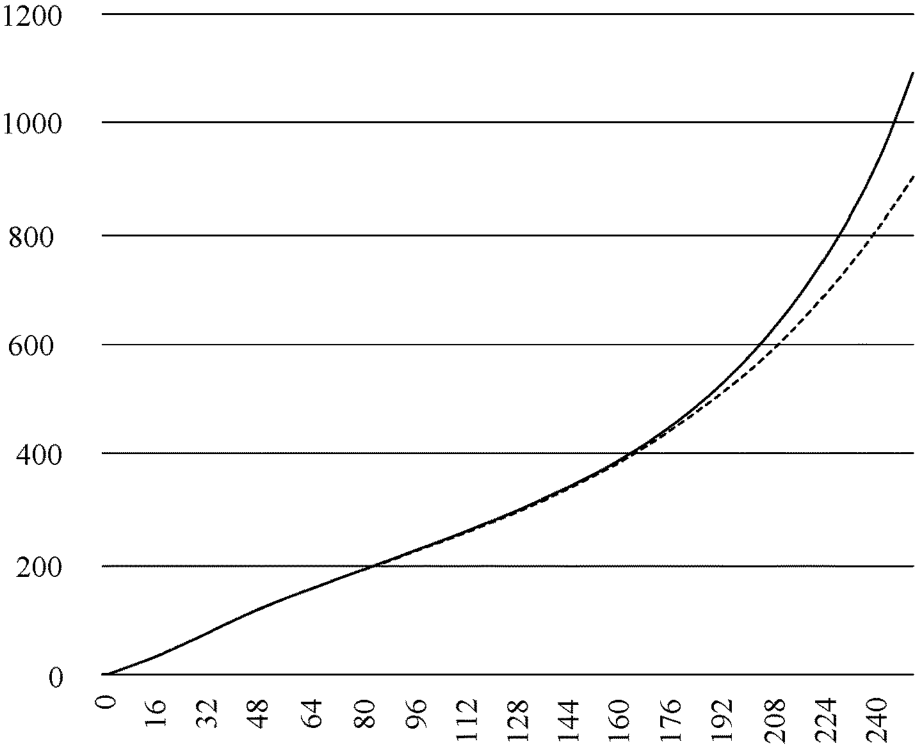
Figure 13A:
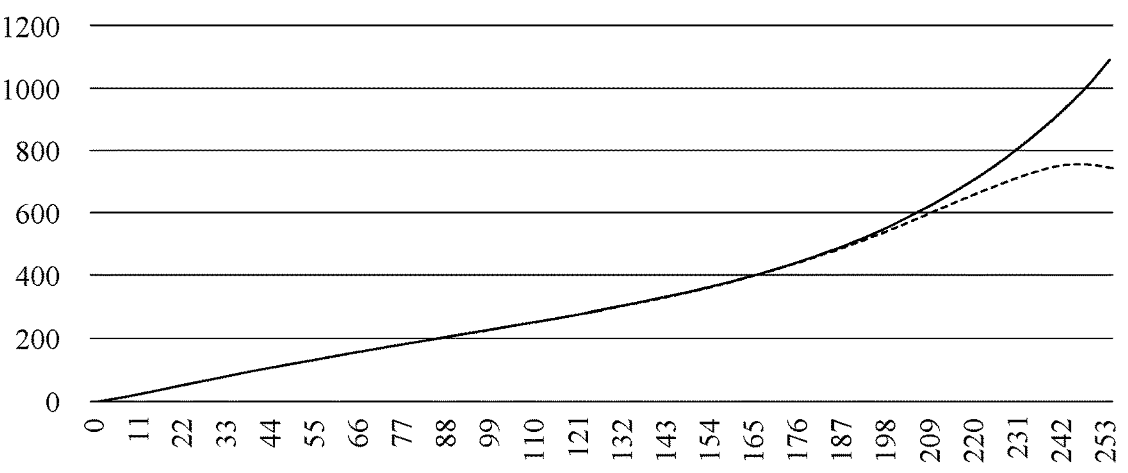
Figure 13B:
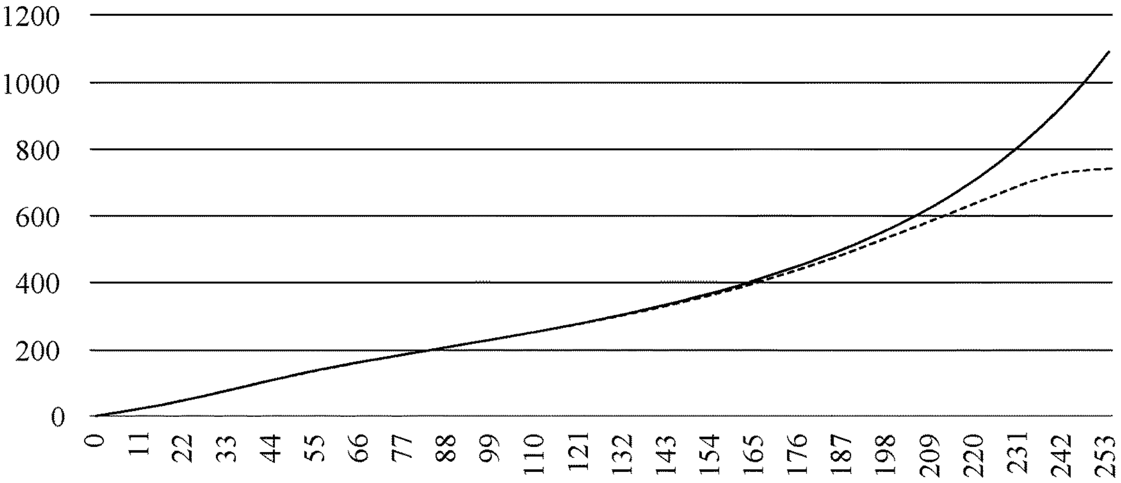
Figure 14:
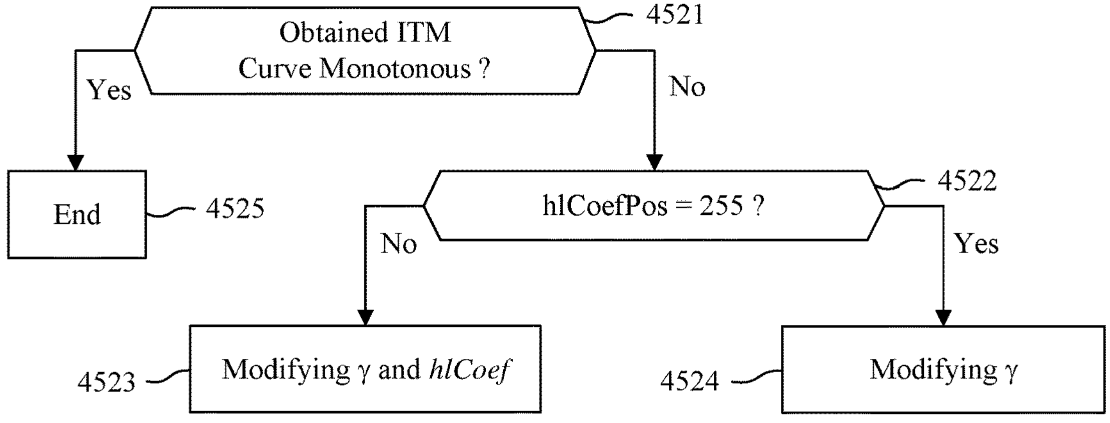

FIG. 12A compares a graphical representation of a gain function G( ) with a modified gain function Gbs( ) allowing performing a bright spot attenuation;

FIG. 12B compares ITM curves obtained with a gain function G( ) and with a modified gain function Gbs( );

FIG. 13A illustrates a non-monotonous ITM curve obtained by introducing a bright spot attenuation in an ITM function;

FIG. 13B shows a correction of an ITM curve allowing insuring monotonicity of the ITM curve; and, FIG. 14 represents schematically a method allowing insuring the monotonicity of an ITM curve.

5. DETAILED DESCRIPTION

Different kinds of inverse tone mapping methods exist. For example, in the field of local tone mapping algorithms, the patent application WO2015/096955 discloses a method comprising, for each pixel P of an SDR (or LDR) image, a step of obtaining a pixel expansion value E(P) and then a step of inverse tone mapping the luminance Y(P) of the pixel P into an expanded luminance value $\gamma_{exp}(P)$ as follows:

$$Y_{exp}(P) = Y(P)^{E(P)} \times [Y_{enhance}(P)] \quad \text{(eq. 1)}$$

Where:

$Y_{exp}(P)$ is the expanded luminance value of the pixel P.

Y(P) is the luminance value of the pixel P within the SDR (or LDR) image.

$Y_{enhance}(P)$ is a luminance enhancement value for the pixel P within the SDR (or LDR) image.

E(P) is a pixel expansion value for the pixel P.

The set of values E(P) for all pixels of an SDR (or LDR) image forms an expansion map or expansion function or gain function, for the image. This gain function can be generated by different methods. For example, a method consists in low-pass filtering the luminance value Y(P) of each pixel P to obtain a low-pass filtered luminance value $\gamma_{low}(P)$ and applying a quadratic function to the low-pass filtered luminance value, said quadratic function being defined by parameters a, b and c according to the following equation:

$$E(P) = a[Y_{low}(P)]^2 + b[Y_{low}(P)] + c$$

Another method based on WO2015/096955 facilitating a hardware implementation uses the following equation:

$$Y_{exp}(P) = (Y_{low}(P))^{(E(Y_{low}(P))-d)} \times Y^d$$

The above equation can be expressed as follows:

$$Y_{exp}(P) = (Y_{low}(P))^{E(Y_{low}(P))} \times \left(\frac{Y(P)}{Y_{low}(P)}\right)^d$$

where the parameter d can be set for instance to d=1.25. $Y_{enhance}(P)$ in this case is a function of both the image luminance value Y(P) and the low-pass version of said luminance value $Y_{low}(P)$.

The document ITU-R BT.2446-0 discloses a method for converting SDR (or LDR) contents to HDR contents by using the same kind of formula:

$$Y'_{exp}(P) = Y''(P)^{E(Y''(P))}$$

wherein $Y'$ is in the [0 … 1]

$$Y'' = 255.0 \times Y'$$

$$E = a_1 Y''^2 + b_1 Y'' + c_1 \text{ when } Y'' \le T$$

$$E = a_2 Y''^2 + b_2 Y'' + c_2 \text{ when } Y'' > T$$

$$T = 70$$

$$a_1 = 1.8712e-5,\ b_1 = -2.7334e-3,\ c_1 = 1.3141$$

$$a_2 = 2.8305e-6,\ b_2 = -7.4622e-4,\ c_2 = 1.2528$$

As can be seen from the above, the gain function is based on a power function whose exponent depends on the luminance value of the current pixel, or on a filtered version of this luminance value.

More generally, all the global expansion methods can be expressed as an ITM function of the following form for all input values different from zero (for zero at the input, the output is logically zero):

$$Y_{exp} = Y^{G(Y)} \quad \text{(eq. 2)}$$

where G( ) is a gain function of the luminance Y.

In the same way, all local expansion methods can be expressed in the following way for all input values different from zero:

$$Y_{exp} = Y_F^{G(Y_F)} Y_{enhance}(Y, Y_{S_i}) \quad \text{(eq. 3)}$$

where $Y_F$ is a filtered version of the luminance Y, G( ) is a gain function of $Y_F$ and Y enhance is a function of the luminance Y and its surrounding pixels $Ys_i$.

In both cases (global or local), the gain function is monotonic, in order to be consistent with the input SDR image.

Some inverse tone mapping (ITM) methods use a gain function G( ) based on predetermined expansion parameters (as described for example in the ITU-R BT.2446-0 document) without any adaptation to image content. The patent application EP3249605 discloses a method for inverse tone mapping of an image that can adapt automatically to the content of the image. The method uses a set of profiles forming a template. These profiles are predetermined in a learning phase that is an offline processing. Each profile is defined by a visual feature, such as a luminance histogram, to which a gain function is associated.

In the learning phase, the profiles are determined from a large number of reference images that are manually graded by colorists, who manually set the inverse tone mapping parameters and generate the gain functions for these images. Then the reference images are clustered based on these generated gain functions. Each cluster is processed in order to extract a representative histogram of luminance and a representative gain function associated thereto, thus forming a profile issued from said cluster.

When a new SDR content is received, histograms are determined for SDR images of the new SDR content. Each computed histogram is then compared to each of the histograms saved in the template, issued from the learning phase, in order to find the best match histogram of the template. For example, a distance between a computed histogram and each of the histograms saved in the template is calculated. Then the gain function related to the histogram of the template giving the best match with the computed histogram is selected and used to perform inverse tone mapping on the image (or images) corresponding to the computed histogram. In this way, the best gain function of the template adapted to an SDR image is applied to output a corresponding HDR image.

As mentioned above, even when applying the best possible gain function, an inverse tone mapping operation may generate an HDR image comprising too bright areas (or highlights) that may either exceed display device capacities or be unpleasant for a user.

To solve the above problem, the patent application EP3503019A1 discloses a method which attenuates the bright areas down to a predefined target luminance value provided that at least a predetermined percentage of the pixels of the input image have luminance values higher than the input luminance whose expanded value is equal to the target luminance value. Nevertheless, this method depends on a fixed threshold: as it is applied on all the incoming images, it may lead to flickering effects or at least to sudden changes in the overall brightness of the expanded images. This can be the case for example when a credits list with high luminance values rolls at the end of a content and provokes an attenuation.

The various embodiments described in the following aims at improving this situation by adaptively and smoothly attenuating the largest bright areas to a predefined target luminance as soon as a proportion of pixels comprised in these areas is larger than a predefined proportion.

Figure 1:
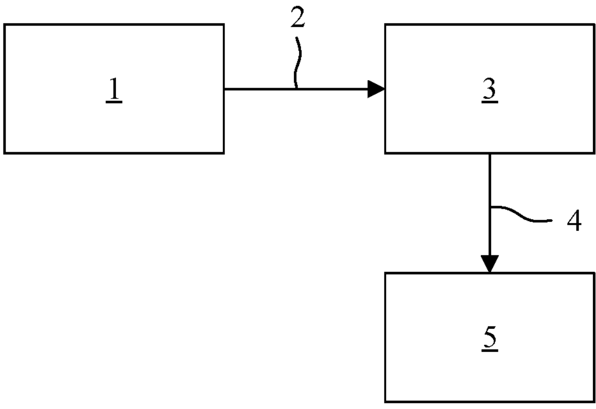
FIG. 1 illustrates an example of context in which embodiments described in the following could be implemented.

FIG. 1 illustrates an example of context in which embodiments described in the following could be implemented.

In FIG. 1, a device 1, that could be a camera, a storage device, a computer or any device capable of delivering a SDR content, transmits a SDR content to a system 3 using a communication channel 2. The communication channel 2 could be a wired (for example Ethernet) or a wireless (for example WiFi, 3G, 4G or 5G) network link.

The SDR content comprises a fixed image or a video sequence.

The system 3 converts the SDR content to an HDR content, i.e. applies an inverse tone mapping to the SDR content to obtain an HDR content.

The obtained HDR content is then transmitted to a display system 5 using a communication channel 4, that could be a wired or wireless network. The display system then displays the HDR content.

In an embodiment, the system 3 is comprised in the display system 5.

In an embodiment, the device 1, the system 3 and the display system 5 are all comprised in a same system.

In an embodiment, the display system 5 is replaced by a storage device that stores the HDR content.

Figure 2:
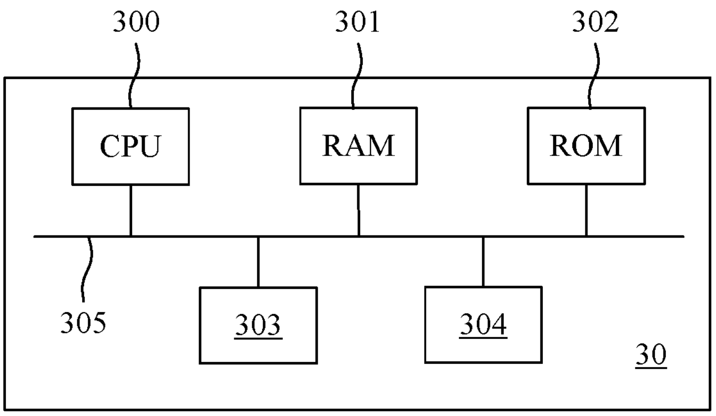
FIG. 2 illustrates schematically an example of hardware architecture of a processing module able to implement various aspects and embodiments.

FIG. 2 illustrates schematically an example of hardware architecture of a processing module 30 comprised in the system 3 and able to implement different aspects and embodiments. The processing module 30 comprises, connected by a communication bus 305: a processor or CPU (central processing unit) 300 encompassing one or more microprocessors, general purpose computers, special purpose computers, and processors based on a multi-core architecture, as non-limiting examples; a random access memory (RAM) 301; a read only memory (ROM) 302; a storage unit 303, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 304 for exchanging data with other modules, devices, systems or equipment. The communication interface 304 can include, but is not limited to, a transceiver configured to transmit and to receive data over a communication channel. The communication interface 304 can include, but is not limited to, a modem or network card.

The communication interface 304 enables for instance the processing module 30 to receive a SDR content and to provide a HDR content.

The processor 300 is capable of executing instructions loaded into the RAM 301 from the ROM 302, from an external memory (not shown), from a storage medium, or from a communication network. When the processing module 30 is powered up, the processor 300 is capable of reading instructions from the RAM 301 and executing them. These instructions form a computer program causing, for example, the implementation by the processor 300 of an inverse tone mapping method described in the following in relation to FIG. 4.

All or some of the algorithms and steps of said inverse tone mapping method may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 3:
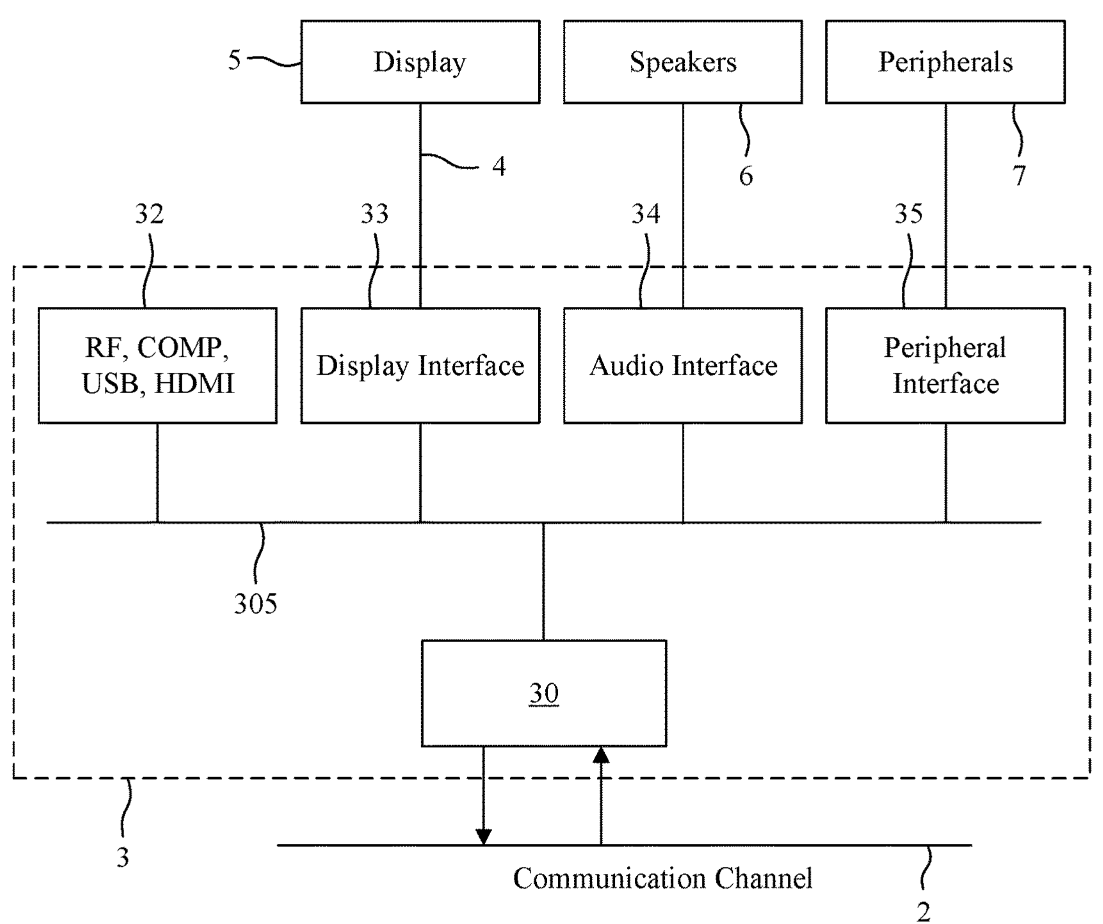
FIG. 3 illustrates a block diagram of an example of a system in which various aspects and embodiments are implemented.

FIG. 3 illustrates a block diagram of an example of the system 3 in which various aspects and embodiments are implemented. System 3 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 3, singly or in combination, can be embodied in a single integrated circuit (IC), multiple ICs, and/or discrete components. For example, in at least one embodiment, the system 3 comprises one processing module 30 that implement the inverse tone mapping method. In various embodiments, the system 3 is communicatively coupled to one or more other systems, or other electronic devices, via, for example, a communications bus or through dedicated input and/or output ports.

The input to the processing module 30 can be provided through various input modules as indicated in block 32. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 3, include composite video.

In various embodiments, the input modules of block 32 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 3 to other electronic devices across USB and/or HDMI connections. It is to be understood that various aspects of input processing, for example, Reed-Solomon error correction, can be implemented, for example, within a separate input processing IC or within the processing module 30 as necessary. Similarly, aspects of USB or HDMI interface processing can be implemented within separate interface ICs or within the processing module 30 as necessary. The demodulated, error corrected, and demultiplexed stream is provided to the processing module 30.

Various elements of system 3 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 3, the processing module 30 is interconnected to other elements of said system 3 by the bus 305.

The communication interface 304 of the processing module 30 allows the system 3 to communicate on the communication channel 2. The communication channel 2 can be implemented, for example, within a wired and/or a wireless medium.

Data is streamed, or otherwise provided, to the system 3, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2 and the communications interface 304 which are adapted for Wi-Fi communications. The communications channel 3 of these embodiments is typically connected to an access point or router that provides access to external networks including the Internet for allowing streaming applications and other over-the-top communications. Other embodiments provide streamed data to the system 3 using a set-top box that delivers the data over the HDMI connection of the input block 32. Still other embodiments provide streamed data to the system 3 using the RF connection of the input block 32. As indicated above, various embodiments provide data in a non-streaming manner. Additionally, various embodiments use wireless networks other than Wi-Fi, for example a cellular network or a Bluetooth network.

The system 3 can provide an output signal to various output devices, including the display 5, speakers 6, and other peripheral devices 7. The display 5 of various embodiments includes one or more of, for example, a touchscreen display, an organic light-emitting diode (OLED) display, a curved display, and/or a foldable display. The display 5 can be for a television, a tablet, a laptop, a cell phone (mobile phone), or other devices. The display 5 can also be integrated with other components (for example, as in a smart phone), or separate (for example, an external monitor for a laptop). The display device 5 is HDR content compatible. The other peripheral devices 7 include, in various examples of embodiments, one or more of a stand-alone digital video disc (or digital versatile disc) (DVR, for both terms), a disk player, a stereo system, and/or a lighting system. Various embodiments use one or more peripheral devices 7 that provide a function based on the output of the system 3. For example, a disk player performs the function of playing the output of the system 3.

In various embodiments, control signals are communicated between the system 3 and the display 5, speakers 6, or other peripheral devices 7 using signaling such as AV.Link, Consumer Electronics Control (CEC), or other communications protocols that enable device-to-device control with or without user intervention. The output devices can be communicatively coupled to system 3 via dedicated connections through respective interfaces 33, 34, and 35. Alternatively, the output devices can be connected to system 3 using the communications channel 2 via the communications interface 304. The display 5 and speakers 6 can be integrated in a single unit with the other components of system 3 in an electronic device such as, for example, a television. In various embodiments, the display interface 5 includes a display driver, such as, for example, a timing controller (T Con) chip.

The display 5 and speaker 6 can alternatively be separate from one or more of the other components, for example, if the RF module of input 32 is part of a separate set-top box. In various embodiments in which the display 5 and speakers 6 are external components, the output signal can be provided via dedicated output connections, including, for example, HDMI ports, USB ports, or COMP outputs.

Various implementations involve applying an inverse tone mapping method. The inverse tone mapping, as used in this application, can encompass all or part of the processes performed, for example, on a received SDR image or video stream in order to produce a final HDR output suitable for display. In various embodiments, such processes include one or more of the processes typically performed by an image or a video decoder, for example, a JPEG decoder or an H.264/AVC (ISO/IEC 14496-10—MPEG-4 Part 10, Advanced Video Coding), H.265/HEVC (ISO/IEC 23008-2—MPEG-H Part 2, High Efficiency Video Coding/ITU-T H.265) or and H.266/VVC (Versatile Video Coding) under development by a joint collaborative team of ITU-T and ISO/IEC experts known as the Joint Video Experts Team (JVET))decoder.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry the HDR image or video sequence of a described embodiment. Such a signal can be formatted, for example, as an electromagnetic wave (for example, using a radio frequency portion of spectrum) or as a baseband signal. The formatting can include, for example, encoding an HDR image or video sequence in an encoded stream and modulating a carrier with the encoded stream. The information that the signal carries can be, for example, analog or digital information. The signal can be transmitted over a variety of different wired or wireless links, as is known. The signal can be stored on a processor-readable medium.

Figure 4:
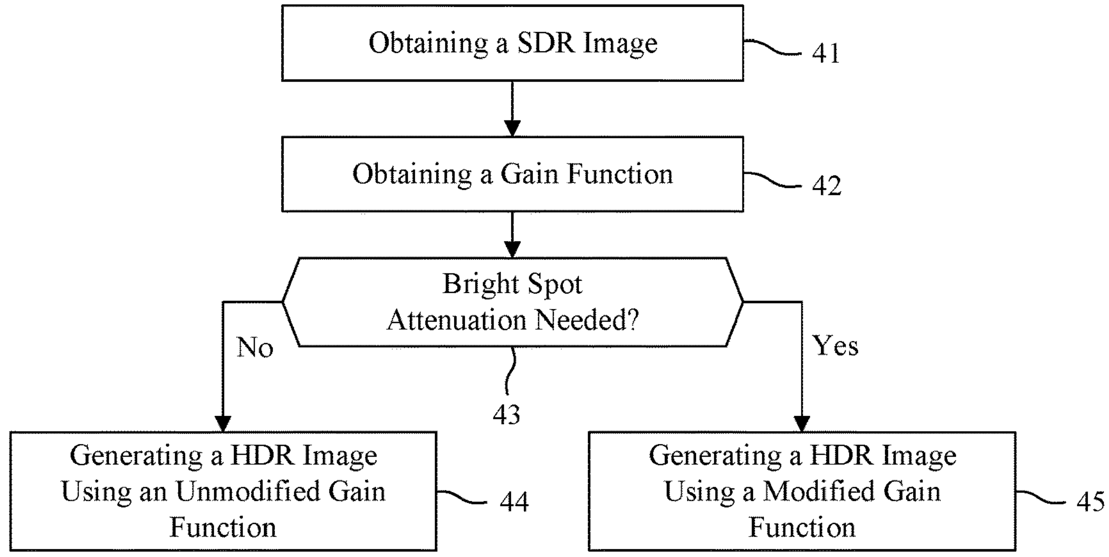
FIG. 4 illustrates schematically a high-level representation of various embodiments of a method of improving an inverse tone mapping method.

FIG. 4 illustrates schematically a high-level representation of various embodiments of a method of inverse tone mapping. In the various embodiments described in the following, it is assumed that a gain function G( ) has been defined for a current SDR image. This gain function is defined so that $Y'^{G(Y')}$ is monotonous, Y' being a gammatized version of a linear luminance value Y.

In the various embodiments, an histogram of the luminance values Y' of the SDR image is used to detect an amount of information in the high luminance levels.

As an example, in the rest of the document, a target LMax (i.e. the target highest luminance value) of the ITMO is "1000" nits, and the current input SDR image is supposed to be a "8" bits image, with the value "255" corresponding to 100 nits.

In that case, the ITM function can be written as follows:

$$Y'_{HDR} = Y'^{G(Y'_{SDR})}_{SDR} \quad \text{(eq. 4)}$$

where $Y_{SDR}'$ is a luminance value of the current input SDR image and $Y_{HDR}'$ is a luminance value of the output HDR image. The luminance value $Y_{SDR}'$, whatever its number of bits, is normalized in the range [0; 255]. In the same way, if LMax is "1000" nits, the luminance value $Y_{HDR}'$, whatever its number of bits, is normalized in the range [0; 1000]. That means that, if the gain function for $Y_{HDR}$ is such that $Y_{HDR}'=Y_{SDR}'^{G(Y_{SDR}')}$ is higher than "1000" nits, i.e. when linearized relatively to "1000" nits, then $Y_{HDR}'$ is clipped to "1000" nits, removing any details in the corresponding areas.

Both $Y_{SDR}'$ and $Y_{HDR}'$ are gammatized and both $Y_{SDR}$ and $Y_{HDR}$ are linear, e.g.:

$$Y_{SDR} = (Y'_{SDR}/255)^{2.4} \times 100$$

$$Y_{HDR} = (Y'_{HDR}/1000)^{2.4} \times 1000$$

In a step 41, the processing module 30 obtains an SDR image, called current SDR image.

In a step 42, the processing module 30 obtains the gain function G( ), called initial gain function G( ) of the ITM function of equation 4. Once obtained, the gain function G( ) allows obtaining an ITM curve from the ITM function of equation 4.

Figure 5A:
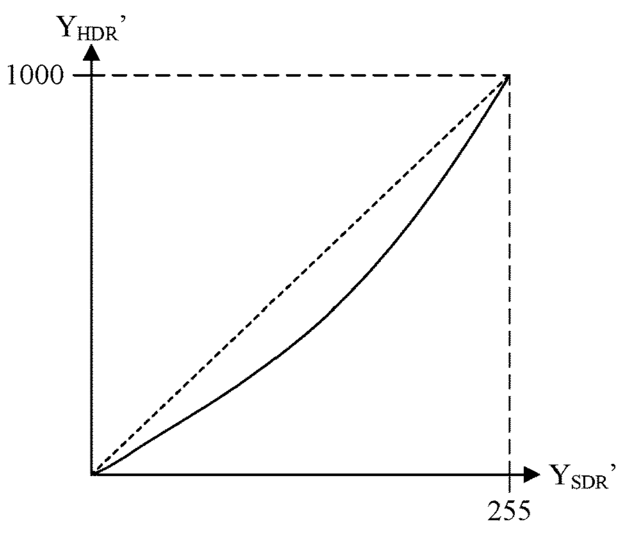
FIGS. 5A, 5B and 5C represent three examples of ITM curves.
Figure 5B:
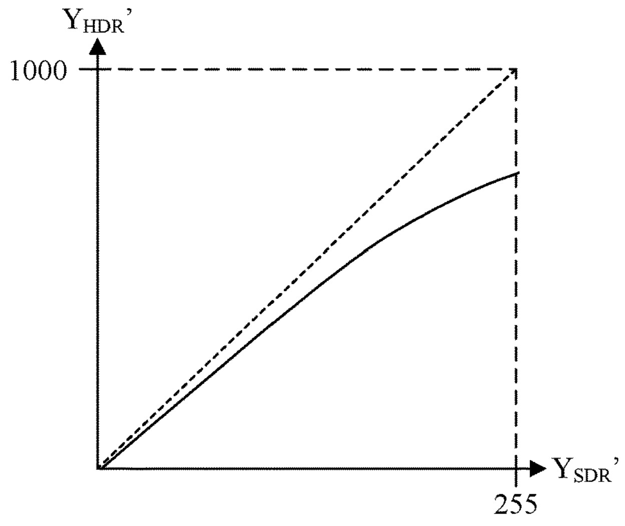
Figure 5C:
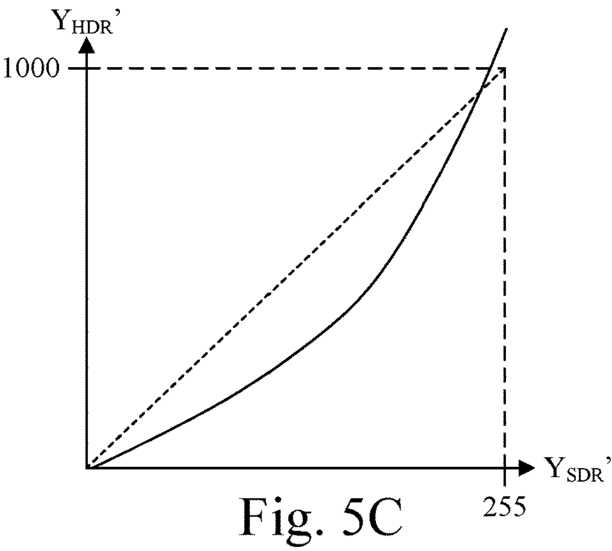

FIGS. 5A, 5B and 5C represent three examples of ITM curves targeting a "1000" nits display obtained with equation 4. The SDR input is in the range [0 . . . 255] (which means that it must be normalized in the range [0;255] if it is not an "8" bits image), and the output in the range [0;1000]. The curve of FIG. 5A shows that the maximum input value "255" (corresponding to "100" nits) produces an output equal to "1000" that corresponds to "1000" nits when linearized. The curve of FIG. 5B shows that the maximum value is around "700", which corresponds to "425" nits when linearized, and the curve of FIG. 5C shows a maximum value around "1200" which corresponds to "1550" nits when linearized.

The curve of FIG. 5A doesn't produce clipped values but can produce some dazzling effect if the input image contains large bright (quasi-white) areas. The curve of FIG. 5B doesn't produce any dazzling effect whatever the input. The curve of FIG. 5C can potentially produce much more dazzling effect than the curve of FIG. 5A if the input image contains large areas with high values (and not only for quasi-white areas).

In a step 43, the processing module 30 determines if a bright spot attenuation is needed for the current SDR image. A bright spot attenuation consists in reducing a luminance of too bright areas of the HDR image obtained from the SDR image to a target expanded luminance value BSTarget. A bright spot attenuation is applied when at least a predetermined percentage of the pixels of the current SDR image have a luminance value higher than a luminance value Y', the luminance value Y' being such that an expanded value obtained by applying the inverse tone mapping function of equation 4 to said luminance value Y' that when linearized is equal to a target expanded luminance value BSTarget. Step 43 is detailed in relation to FIGS. 6, 7 and 8. In other words, a bright spot attenuation is applied if an analysis of the current SDR image shows that at least a percentage (P) of the pixels of an HDR image resulting from an application of the first inverse tone mapping function to the current SDR image have an expanded luminance value once linearized higher than the target expanded luminance value BSTarget.

If no bright spot attenuation is needed for the current SDR image, step 43 is followed by a step 44. During step 44, the processing module 30 applies a first ITM function to the current SDR image to obtain an HDR image. The first ITM function is for example the ITM function of equation 4 based on the initial gain function G( ).

Otherwise, it a bright spot attenuation is needed for the current SDR image, step 43 is followed by a step 45. During step 45, the processing module 30 applies a second ITM function to the current SDR image to obtain an HDR image. The second ITM function corresponds for example to the ITM function of equation 4 in which the initial gain function has been replaced by a modified gain function Gbs( ) Embodiments of the obtaining and applying of the modified gain function Gbs( ) are detailed in relation to FIGS. 6A, 7, 8 and 9A, 6B, 9B, 10, 11A, 11B, 12A, 12B, 13A, 13B and 14.

Figure 6A:
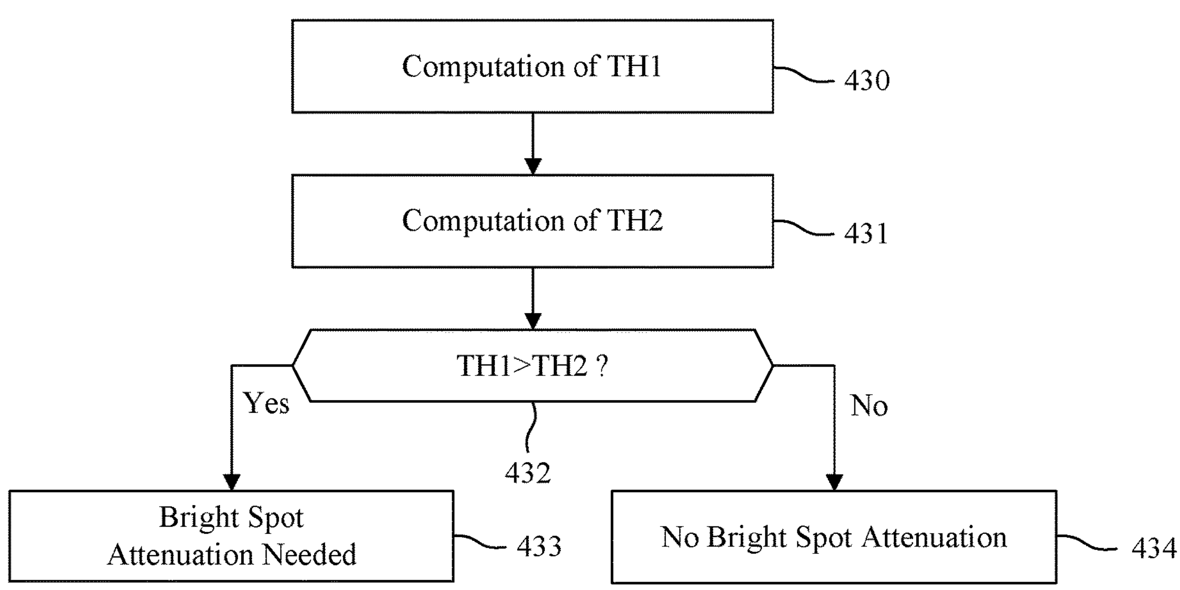
FIG. 6A illustrates schematically a first embodiment of a step of determining if a current SDR image requires a bright spot attenuation or not during an ITM process.

FIG. 6A illustrates schematically a first embodiment of a step of determining if a current SDR image requires a bright spot attenuation or not during an ITM process.

The process of FIG. 6A corresponds to a first embodiment of step 43 in FIG. 4.

In a step 430, the processing module 30 computes a first threshold TH1. The first threshold TH1 corresponds to a gammatized luminance value $Y_{SDR}'$ for which a predetermined percentage P of the pixels of the current SDR image have luminance values higher than or equal to this threshold luminance value TH1. The computation of the first threshold TH1 is detailed in the following in relation to FIG. 7.

In a step 431, the processing module 30 computes a second threshold TH2. The second threshold TH2 corresponds to the last gammatized luminance value of $Y_{SDR}'$ (in increasing value of $Y_{SDR}'$ from zero to "255") whose expanded luminance value $Y_{HDR}'$ when linearized is lower than or equal to the target expanded luminance value BSTarget. In other words, the second threshold TH2 verifies $Y_{HDR}' \leq$ BSTarget' and $(Y+1)_{HDR}' >$ BSTarget', where BSTarget' is a gammatized version of BSTarget. The computation of the second threshold TH2 is detailed in the following in relation to FIG. 8.

In a step 432, the processing module 30 compares the first threshold TH1 to the second threshold TH2. If TH1>TH2, the processing module 30 determines in a step 433 that the current SDR image requires a bright spot attenuation during the ITM process. Otherwise, the processing module 30 determines in a step 434 that no bright spot attenuation is needed during the ITM process of the current SDR image.

Figure 6B:
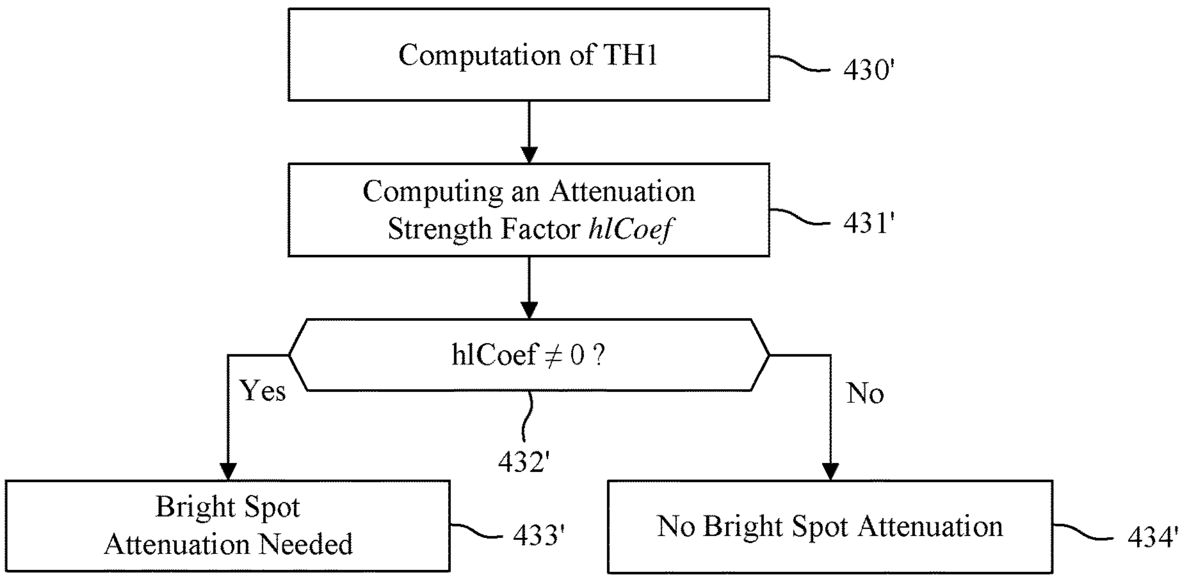
FIG. 6B illustrates schematically a second embodiment of a step of determining if a current SDR image requires a bright spot attenuation or not during an ITM process.
Figure 7:
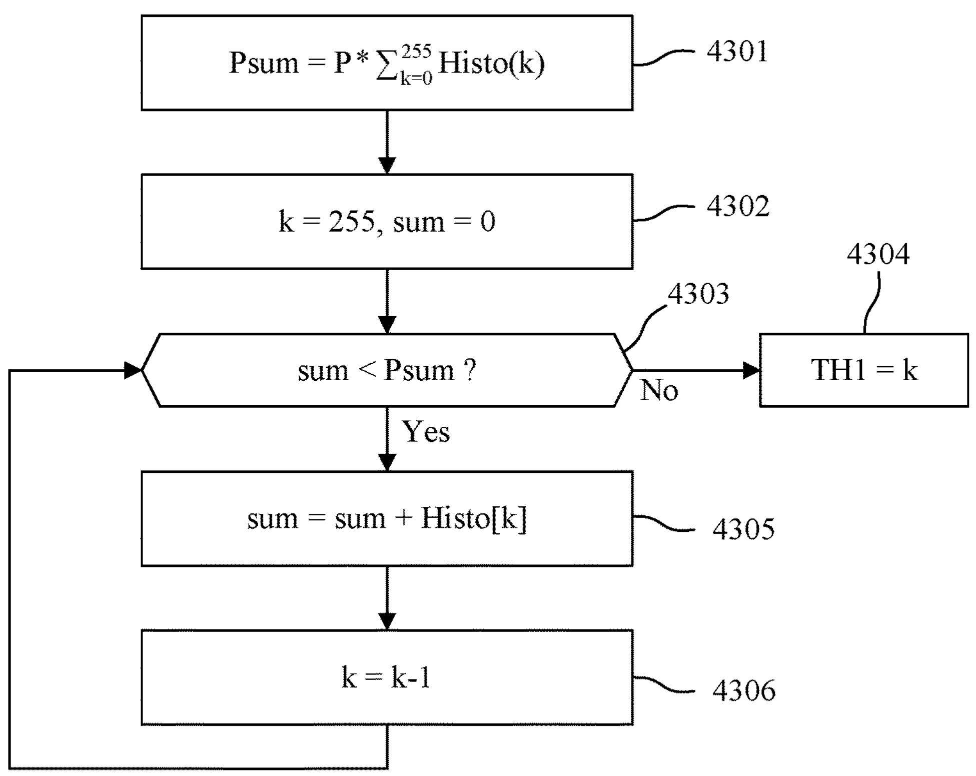
FIG. 7 illustrates schematically a method for obtaining a first threshold used for determining if a current SDR image requires a bright spot attenuation or not.

FIG. 7 illustrates schematically a method for obtaining the first threshold TH1. The method of FIG. 7 corresponds to step 430 in FIG. 6.

In a step 4301, the processing module 30 initialize a value Psum. Psum is a result of a multiplication of the percentage P (expressed as a value between zero and one) defined above by a total number of pixels in the current SDR image. The total number of pixels in the current SDR image is equal to the sum of all the bins in an histogram Histo of said current SDR image:

$$Psum = P * \sum_{k=0}^{255} Histo(k)$$

TH1 is the first value of $Y_{SDR}'$ (in decreasing order from "255" to zero) for which:

$$\sum_{k=Th1}^{255} Histo(k) \geq Psum$$

and is computed as follows:

In step 4302, the processing module 30 initialize a variable k to "255" and a variable sum to zero.

In a step 4303, the processing module 30 compares the variable sum to the value Psum. If sum<Psum step 4303 is followed by a step 4305. During step 4305, the processing module 30 increases the value of the variable sum of the value Histo[k] of the histogram Histo at the position k.

$$\mathrm{sum} = \mathrm{sum} + Histo[k]$$

In a step 4306, the processing module 30 decrement the variable k of one unit. Step 4306 is followed by step 4303.

If sum≥Psum at step 4303, the processing module 30 sets the value of the first threshold TH1 to the value of the variable k.

Figure 8:
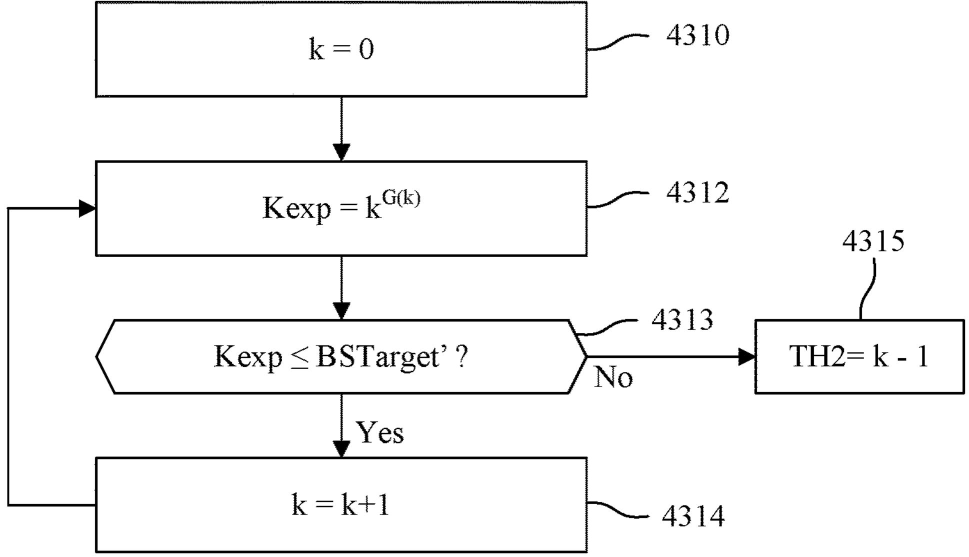
FIG. 8 illustrates schematically a method for obtaining a second threshold used for determining if a current SDR image requires a bright spot attenuation or not.

FIG. 8 illustrates schematically a method for obtaining the second threshold TH2.

The method of FIG. 8 corresponds to step 431 in FIG. 6.

In a step 4310, the processing module 30 initialize a variable k to zero.

In a step 4312, the processing module 30 sets a variable Kexp to a value $k^{G(k)}$:

$$Kexp = k^{G(k)}$$

In a step 4313, the processing module 30 compares the variable Kexp to the gammatized target expanded luminance value BSTarget'.

If Kexp≤BSTarget', the processing module 30 increments the variable k of one unit in a step 4314. Step 4314 is followed by step 4312.

Otherwise, if Kexp>BSTarget', the processing module 30 sets the value of the second threshold TH2 to the value of the variable k−1.

Figure 9A:
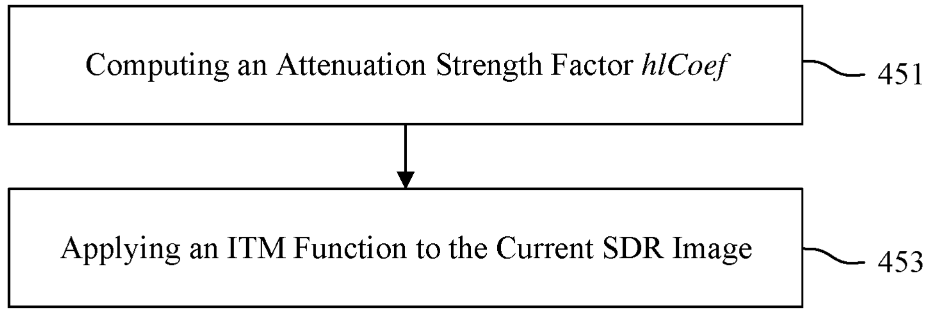
FIG. 9A illustrates schematically a first embodiment of a step of applying an ITM function based on a modified gain function.

FIG. 9A illustrates schematically a first embodiment of a step of computing and applying an ITM function based on a modified gain function.

The process of FIG. 9A corresponds to a first embodiment of step 45 in FIG. 4. Document EP3503019A1 proposes the following modified gain function Gbs( ) to perform a bright spot attenuation:

$$Gbs = G(Y') - hlCoef * \left(Y'/255\right)^{\gamma} \qquad \text{(eq. 5)}$$

where a preferred value for γ is "6". hlCoef is an attenuation strength factor used to control a strength of the bright spot attenuation during the ITM process. As can be seen, the modified gain function Gbs( ) is a function derived from the initial gain function G( ) in which a gain G(Y) provided by the initial gain function G( ) is attenuated by an attenuation function hlCoef*(Y'/255)$^{\gamma}$, said attenuation function being an increasing function of luminance values Y' weighted by the attenuation strength factor hlCoef controlling a strength of the bright spot attenuation.

In the first embodiment of step 45, the processing module 30 computes the attenuation strength factor hlCoef as follows:

$$hlcoef = \frac{\left(G(TH1) - \log(BSTarget')/\log(TH1)\right)}{\left(TH1/255\right)^{\gamma}}$$

In a step 453, the processing module applies to the current SDR image an ITM function based on the modified gain function Gbs( ). The Modified gain function Gbs( ) is obtained by using the attenuation strength factor hlCoef obtained in step 451 in equation "5". The ITM function is for example the ITM function of equation "4" which becomes:

$$Y'_{HDR} = Y'^{\,Gbs\left(Y'_{SDR}\right)}_{SDR} = Y'^{\,G\left(Y'_{SDR}\right) - hlCoef * \left(Y'_{SDR}/255\right)^{\gamma}}_{SDR}$$

Figure 11A:
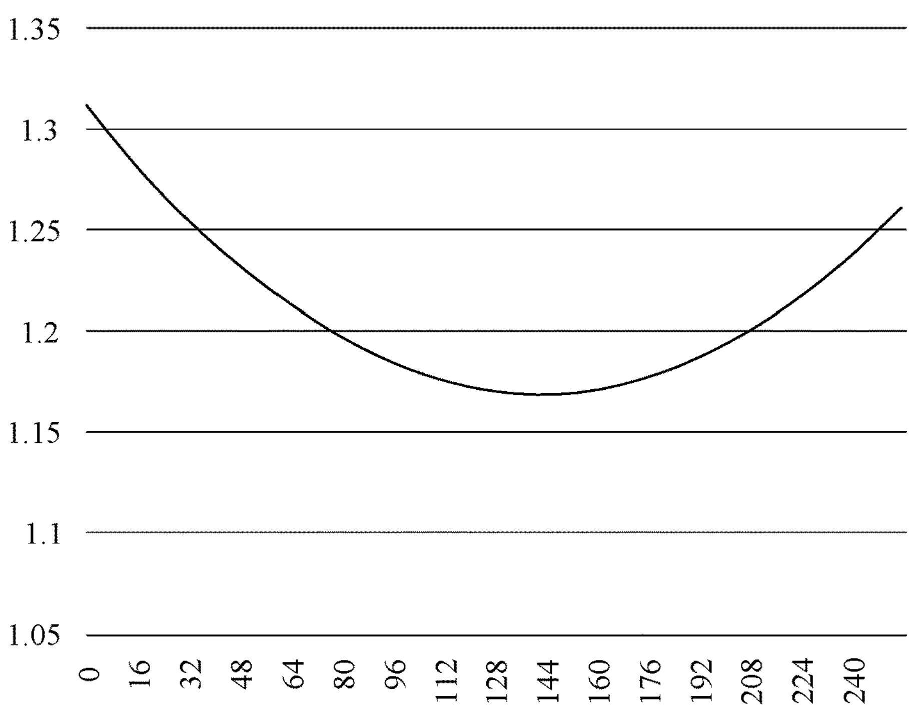
FIG. 11A is a graphical representation of a gain function G( )
Figure 11B:
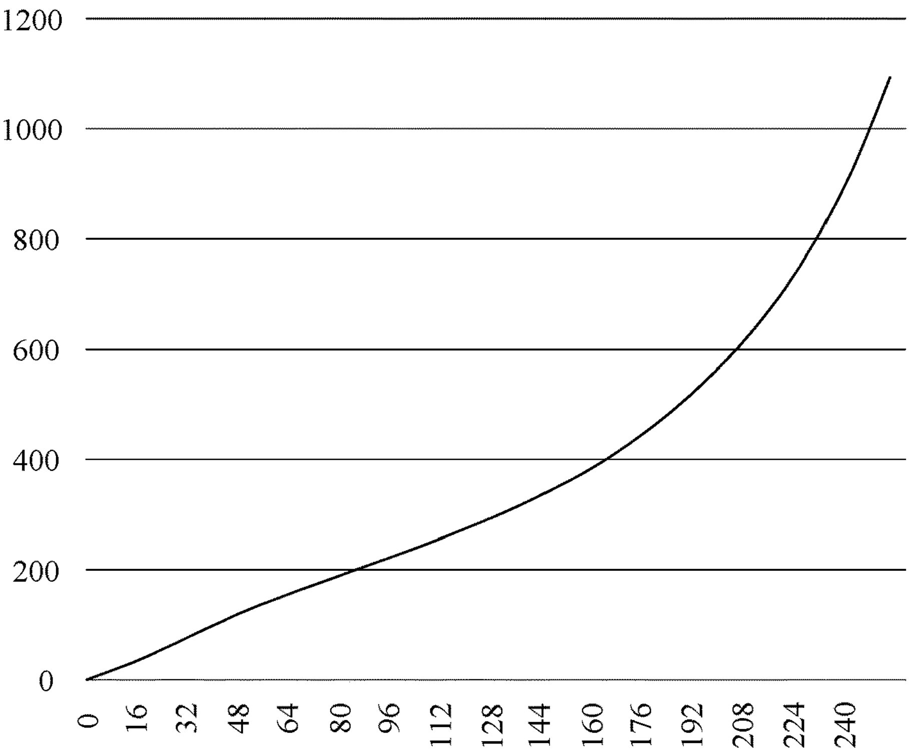
FIG. 11B is a graphical representation of a curves of expanded luminance values (i.e. an ITM curve)

FIG. 11A is a graphical representation of a gain function G( ). An application of the gain function of FIG. 11A on an input image with luminance values between zero and "255" allows obtaining a curve of expanded luminance values (i.e. an ITM curve) represented in relation to FIG. 11B.

FIG. 12A compares the graphical representation of the gain function G( ) with a modified gain function Gbs( ) (represented with a dashed line) allowing performing a bright spot attenuation. FIG. 12B compares the curves of expanded luminance values obtained with the gain function G( ) and the modified gain function Gbs( ) (in dashed lines).

As can be seen while with the initial gain function G( ), expanded luminance values above "1000" nits can be obtained, an application of the modified gain function Gbs( ) ensures that no expanded luminance values exceed the limit of "1000" nits.

One can note that, even if the attenuation strength factor hlCoef is computed for only one luminance value (i.e. for TH1), the attenuation strength factor hlcoef is valid for all possible luminance values.

One can also note that if TH1 has had another value, then the attenuation strength factor hlCoef would have been different, as well as the modified gain function Gbs( ) That means that the modified gain function Gbs( ) allowing a bright spot attenuation is somewhat adaptive, but not enough to prevent from flickering or brutal overall brightness changes.

One can also note that the more the first threshold TH1 is close to the second threshold TH2, the less the modified gain function Gbs( ) allows attenuating the bright areas comparing to the initial gain function G( ). The reason is that the attenuation strength factor is computed at the threshold TH1, not at a luminance value Y' where the histogram Histo[ ] is the highest. This can lead to a situation where no bright spot attenuation is obtained, and consequently to clipped high luminance values.

As mentioned above, the attenuation strength factor hlCoef is computed at the threshold TH1. The computed attenuation strength factor hlCoef is therefore valid if a major part of the pixels represented in the percentage P have a luminance value located around TH1. But, if the major part of these pixels corresponds to a higher luminance value (i.e. >TH1 or even >>TH1), the computed attenuation strength factor hlCoef is not sufficiently representative of these pixels.

More, it would be interesting to introduce a smooth transition zone between the state "attenuated" and the state "not attenuated", which can prevent from flickering when passing alternatively from an SDR image needing a bright spot attenuation to an image not needing a bright spot attenuation (this can happen when the proportion of pixels with a luminance value equal to "255" goes above then under the percentage P alternatively while no other luminance value Y' in the histogram histo[ ] represent a sufficiently significant number of pixels to trigger a bright spot attenuation).

In the following, a second embodiment of steps 43 and 45 is described in relation to FIGS. 6B, 10 and 9B. This second embodiment allows reducing the occurrence of flickering by introducing a smooth transition zone between the state "attenuated" and the state "not attenuated".

FIG. 6B illustrates schematically a second embodiment of the step of determining if a current SDR image requires a bright spot attenuation or not during an ITM process.

The process of FIG. 6B corresponds to a second embodiment of step 43 in FIG. 4.

In a step 430', the processing module 30 computes the first threshold TH1 as described in relation to step 430.

In a step 431', the processing module 30 computes an attenuation strength factor hlCoef executing a method described below in relation to FIG. 10.

In a step 432', the processing module 30 determines if the attenuation strength factor hlCoef is different from zero.

If hlCoef=0, the processing module 30 considers that no bright spot attenuation is needed. In that case, the processing module 30 applies a step 433' identical to step 433.

If hlCoef≠0, the processing module 30 considers that the current SDR image requires bright spot attenuation during the ITM process. In that case, the processing module 30 applies a step 434' identical to step 434.

Figure 9B:
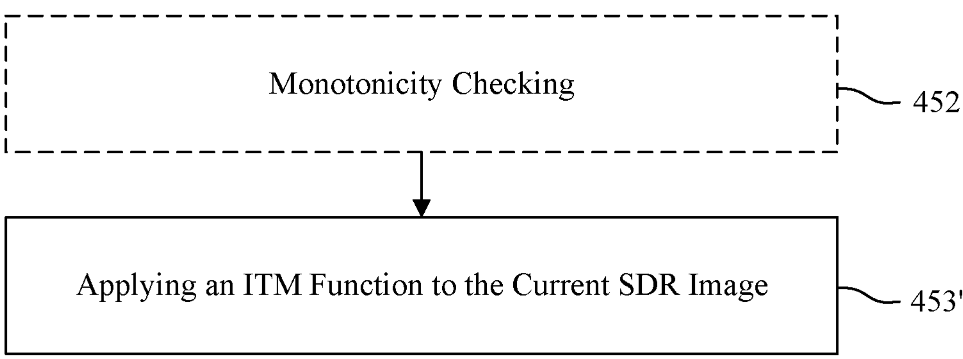
FIG. 9B illustrates schematically a second embodiment of a step of applying an ITM function based on a modified gain function.

FIG. 9B illustrates schematically a second embodiment of a step of applying an ITM function based on a modified gain function.

In a step 453', the processing module applies to the current SDR image an ITM function based on the modified gain function Gbs( ). The modified gain function Gbs( ) is obtained by using the attenuation strength factor hlCoef obtained in step 431' in equation "5". The ITM function is for example the ITM function of equation "4" which becomes:

$$Y'_{HDR} = Y'^{Gbs(Y'_{SDR})}_{SDR} = Y'^{G(Y'_{SDR}) - hlCoef * (Y'_{SDR}/255)^{\gamma}}_{SDR}$$

Figure 10:
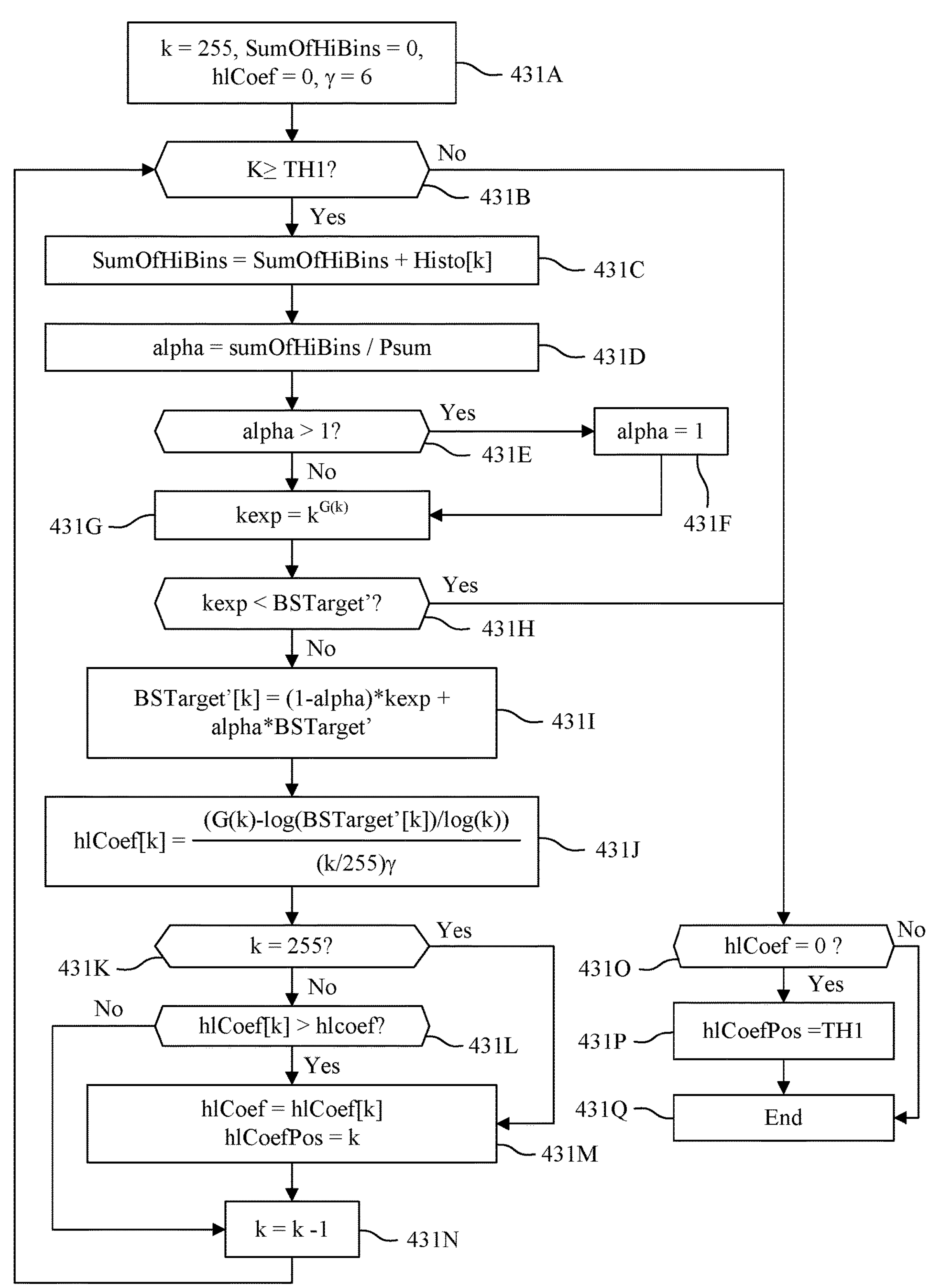
FIG. 10 illustrates schematically a method for computing an attenuation strength factor used to compute the modified gain function.

FIG. 10 illustrates schematically a method for computing an attenuation strength factor hlCoef used to compute the modified gain function.

The method of FIG. 10 corresponds to step 431' in FIG. 6B.

In a step 431A, the processing module 30 initializes:

a variable k to "255". In the following k is decremented from "255" to TH1;

a variable SumOfHiBins to zero;

an attenuation strength factor hlCoef to zero; and,

γ to six.

In a step 431B, the processing module compares the variable k to the first threshold TH1.

If k≤TH1, step 431B is followed by a step 431C. During step 431C, the processing module 30 increments the variable SumOfHiBins of the value of the histogram histo[k].

$$\text{alpha} = sumOfHiBins/Psum$$

As a reminder:

$$Psum = P * \sum_{k=0}^{255} Histo(k)$$

In a step 431E, if the variable alpha>1, alpha is set to "1" in a step 431F. Otherwise, the variable alpha is not modified. Steps 431E and 431F are followed by a step 431G.

During step 431G, an expanded value Kexp of k is computed:

$$Kexp = k^{G(k)}$$

In a step 431H, the expanded value Kexp is compared to the gammatized target expanded luminance value BSTarget'.

If Kexp≥BSTarget', the processing module 30 computes a new target expanded luminance value BSTarget'[k] during a step 431I.

$$BSTarget'[k] = (1 - \text{alpha}) * Kexp + \text{alpha} * BSTarget'$$

As can be seen, the target luminance is redefined for each value of k in function of the expanded value Kexp and of the gammatized expanded target luminance value BSTarget'. The smaller alpha is (i.e. when the proportion of pixel with a luminance value equal or higher than k is low comparing to the percentage P), the closer the new gammatized expanded target luminance value BSTarget'[k] to the expanded value Kexp. The higher alpha is (i.e. when the proportion of pixels with a luminance value equal to or higher than k is high comparing to the percentage P), the closer the new gammatized expanded target luminance value BSTarget'[k] to the gammatized target luminance value BSTarget'.

In a step 431J, the processing module 30 computes a new attenuation strength factor hlCoef[k] for the luminance value k:

$$hlCoef[k] = \frac{\left(G(k) - \log(BSTarget'[k])/\log(k)\right)}{(k/255)^{\gamma}}$$

As can be seen, the more the term log (BSTarget'[k])/log (k) is high, the more the attenuation strength factor hlCoef [k] is low. The maximum value for the attenuation strength factor hlcoef[k] is therefore obtained when BSTarget is equal to BStarget' and the minimum value for the attenuation strength factor hlcoef[k] is obtained when BSTarget[k] equal the expanded value Kexp. In other words, the maximum value of the attenuation strength factor hlCoef[k] is obtained when the proportion of pixels having a value equal or higher than k is high comparing to the percentage P. The minimum value of the attenuation strength factor hlCoef[k] is obtained when the proportion of pixels having a value equal or higher than k is low comparing to the percentage P.

In a step 431K, the processing module 30 determines if the variable k is equal to "255". If no, step 431K is followed by a step 431L. If yes, step 431K is followed by a step 431M.

During step 431M, the processing module 30 sets the value of the attenuation strength factor hlCoef to the value hlCoef[k] and a value hlCoefPos to the value k.

Step 431M is followed by a step 431N during which k is decremented of one unit.

During step 431L, the processing module 30 compares the value hlCoef[k] to the current value of the attenuation strength factor h1Coef.

If hlCoef[k]>hlCoef, the processing module 30 executes step 431M. Otherwise, the processing module 30 executes step 431N.

As can be seen in steps 431K, 431L and 431M, the attenuation strength factor hlCoef[k] is compared to the last computed value of attenuation strength factor hlCoef, and the highest value is kept and stored in hlCoef, as well as the corresponding value of k, stored in the variable hlCoefPos. If k=255, this comparison can't be performed. In that particular case, hlCoef=hlCoef[255], and hlCoefPos=255. These iterations continue down to TH1 but are stopped as soon as kexp<BSTarget', which means that the expanded value of k is not high enough to be attenuated.

Step 431N is followed by step 431B.

If k<TH1 in step 431B or if kexp<BSTarget' in step 431H, the processing module 30 executes step 4310.

During step 4310, the processing module 30 determines if the attenuation strength factor hlCoef is equal to zero, hlCoef=0 means that all the bins of the histogram histo higher than TH1 are empty (no pixel have a luminance value higher than TH1 in the current SDR image). If yes, the processing module 30 sets the value of hlCoef to TH1. The method of FIG. 10 ends at step 431Q. If the attenuation strength factor hlCoef is different from zero, step 431O is followed directly by step 431Q.

The test of step 432' (hlCoef≠0) is equivalent to checking if at least a pixel of the current image with a luminance value Y' at least equal to TH1 have an expanded luminance value obtained by applying the inverse tone mapping function of equation 4 to said luminance value Y', when linearized, higher than the target expanded luminance value BSTarget. Indeed, having hlCoef equal to zero after the execution of the method of FIG. 10 means that the processing module 30 was unable to find at least one pixel of the current SDR image having an expanded luminance value higher than BSTarget'.

This test is in fact performed during steps 431B and 431H for each luminance value k when browsing the histogram in decreasing order from "255" to TH1. One can note that the test of step 431H is equivalent to testing k<TH2.

In the method of FIG. 10, as soon as a luminance value k having an expanded luminance value kexp equal or higher than the gammatized target expanded luminance value BSTarget' is found in the histogram histo, a new value hlcoef[k] is computed. Having this new value hlcoef[k] higher that hlCoef reveals that the attenuation strength factor hlCoef computed until now for preceding luminance values of the histogram histo is not sufficient to attenuate efficiently the bright areas of the current SDR image during the ITM process. Indeed, in that case, the processing module 30 determines that the bright area comprises more pixels than determined for previous values of the luminance k. A stronger attenuation is needed which motivates the replacement of the current value of hlCoef by hlCoef[k]. One benefit of the method of FIG. 10 is that if a small bright area appears in an image and continues growing in the following images, this bright area is more and more attenuated from an image to the next until it comprises a proportion of pixels equal to (or just above than) the percentage P (i.e. when sumOfHiBins is higher than Psum). A smooth transition between the "attenuated" and the "not attenuated" status is therefore obtained. When this bright area comprises a proportion of pixels equal to the percentage P, its expanded value is set to BSTarget'. This is not the case with EP 3 503 019 A1, where the expanded value will be suddenly attenuated which can create a flickering effect in the video sequence.

In an example, we suppose that BSTarget'=862 and consider a growing bright area at k=250, while no other bin exists in the histogram down to TH2 (i.e. the expanded value of TH2 is BSTarget'). In that case, an example of execution of the method of FIG. 10 is as follows:

- proportion of pixels in the bright area=0➔ alpha=0➔ BSTarget'[Y']=Yexp'=$250^{1.254}$=1016➔ hlCoef=0;
- proportion of pixels in the bright area=0.25*Psum➔ alpha=0.25➔ BSTarget'[Y']=0.25*862+ 0.75*1016=977➔ Gbs(Y')=log(977)/log(250)= 1.247➔ hlCoef=0.0079;
- proportion of pixels in the bright area=0.5*Psum➔ alpha=0.5➔ BSTarget'[Y']=0.5*862+0.5*1016= 939➔ Gbs(Y')=log(939)/log(250)=1.240➔ hlCoef=0.0158;
- proportion of pixels in the bright area=0.75*Psum➔ alpha=0.75➔ BSTarget'[Y']=0.75*862+ 0.25*1016=900➔ Gbs(Y')=log(900)/log(250)= 1.232➔ hlCoef=0.0248;
- proportion of pixels in the bright area>Psum➔ alpha= 1➔ BSTarget'[Y']=862➔ Gbs(Y')=log(862)/log (250)=1.224➔ hlCoef=0.0338;

As can be seen, the attenuation strength factor hlCoef increases with the proportion of pixels in the bright areas (up to the value it had in EP3503019A1). We therefore obtain a smooth increase of the bright spot attenuation.

Another benefit of the method of FIG. 10 is that the attenuation strength factor hlCoef saved in the loop is the largest one that has been computed during the complete iterations. That means that the final attenuation strength value hlCoef is not the same if we have 75% of Psum at "250" (G=1.254 in our example) and 25% at "240" (G=1.239 in our example), or if we have 25% of Psum at "250" and 75% at "240". In the first case:

- at Y'=250, proportion of pixels in the bright area=0.75*Psum➔ alpha=0.75➔ BSTarget'[250]= 0.75*862+0.25*1016=900➔ Gbs(250)=log(900)/log (250)=1.232➔ hlCoef[250]=0.0248;
- at Y'=240, proportion of pixels in the bright area=0.7*Psum+0.25*Psum=Psum➔ BSTarget' [240]=862➔ Gbs(240)=log(862)/log(240)= 1.233➔ hlCoef[240]=0.0086;
- ➔ hlCoef for Y'=250 is chosen: hlCoef=0.0248;

In the second case:

- at Y'=250, proportion of pixels in the bright area=0.25*Psum➔ alpha=0.25➔ BSTarget'[Y']= 0.25*862+0.75*1016=977➔ Gbs(Y')=log(977)/log (250)=1.247➔ hlCoef=0.0079;
- at Y'=240, proportion of pixels in the bright area=0.25*Psum+0.75*Psum=Psum➔ BSTarget' [240]=862➔ Gbs(240)=log(862)/log(240)= 1.233➔ hlCoef[240]=0.0086;
- ➔ hlCoef for Y'=240 is chosen: hlCoef=0.0086;

That means that the amount of bright spot attenuation (i.e. the value of the attenuation strength factor hlCoef) depends on the statistical distribution of the luminance values of the pixels in the histogram histo between TH1 and "255". As at each iteration the number of pixels corresponding to the current value of k is added to sumOfHiBins, and as the highest value of hlCoef[k] is stored, the method keeps "memory" of what happened for the previous values of k (for the previous bins of the histogram histo).

In an embodiment, adapted in case the ITM curve goes very high above the maximum authorized expended luminance value Lrnax (for example Lmax=1000 nits), alpha is replaced by alpha Lmax/kexp when kex>Lmax.

In an embodiment, adapted to allow some speculars (for example stars in a sky, or sparks, or any kind of very small bright objects), alpha is computed as follows:

$$alpha = (SumOfHiBins - specularPassThrough)/(Psum - specularPassThrough)$$

specularPassThrough being a fraction of Psum, for example equal to 20%. Then, if at a value k, SumOfHiBins<specularPassThrough, alpha becomes negative and is set to zero. In that case BSTarget[k] is equal to Kexp and consequently the attenuation strength factor hlCoef is equal to zero. No bright-spot attenuation is applied as long as sumOfHiBins is lower than specularPassThrough. specularPassThrough=0 allows retrieving the embodiment of FIG. 10.

As described above, the method of FIG. 4, thanks to the method for computing the attenuation strength factor hlCoef, allows reducing the flickering effect in a video sequence on which is applied an ITM process. In an embodiment, an additional improvement is obtained by introducing temporal filtering in the method of FIG. 4. In this embodiment, the histogram histo is used to detect scene cuts in the video sequence by measuring a distance between the histograms of two consecutive images. As described above, the attenuation strength factor hlCoef is used to compute the modified gain function Gbs( ) to apply to a current SDR image with equation 5:

$$Gbs(Y') = G(Y') - hlCoef * (Y'/255)^{\gamma}$$

The above equation can be written as follows:

$$G(Y') - hlCoef[hlCoefPos] * (Y'/255)^{\gamma}$$

If a scene cut is detected in the current SDR image, the processing module 30 stores hlCoef and hlCoefPos respectively in a variable hlCoefRec and in a variable hlCoefPosRec.

If no scene cut is detected in the current SDR image, the processing module 30 stores hlCoef and hlCoefPos respectively in a variable hlCoefCur and in a variable hlCoefPosCur. In that case, the processing module 30 mixes hlCoefCur (respectively hlCoefPosCur) to hlCoefRec (respectively to hlCoefPosRec) computed on SDR images preceding the current SDR image and following the SDR image on which had been detected the last scene cut to generate a new value for hlCoefRec (respectively hlCoefPosRec). Depending on the relative values of hlCoefCur and hlCoefRec, the mixing process can take two forms:

1. hlCoefCur≥hlCoefRec: in this situation, more bright spot attenuation must be applied to the current SDR image.
   If hlCoefRec=0 (no bright spot attenuation has been applied to SDR images preceding the current SDR image until the last scene cut) then hlCoefPosRec=hlCoefPosCur.
   If hlCoefRec≠0, (some bright spot attenuation has been applied to SDR images preceding the current SDR image until the last scene cut) then hlCoefPosRec=hlCoefPosCur*bsAttack+hlCoefPosRec*(1−bsAttack).
   In both cases: hlCoefRec=hlCoefCur*bsAttack+hlCoefRec*(1−bsAttack). bsAttack is a weighting factor between zero and one. The more bsAttack is close to one, the more the new values of hlCoef and hlCoefPos have a large impact. In an example, bsAttack is set to 0.05 at 25 frames per seconds to have a bright area smoothing effect.
2. hlCoefCur<hlCoefRec: in this situation, less bright spot attenuation must be applied to the current SDR image. hlCoefRec=hlCoefCur*bsRelease+hlCoefRec*(1−bsRelease). If hlCoefCur≠0: hlCoefPosRec=hlCoefPosCur*bsRelease+hlCoefPosRec*(1−bsRelease). bsRelease is a value between zero and one. The more bsRelease is close to one, the more the new values of hlCoef and hlCoefPos have a large impact. In an example, bsRelease=0.05 at 25 frames per seconds to have a bright area smoothing effect.

In the embodiment with temporal filtering, hlCoefRec replaces hlCoef in equation 5 allowing computing Gbs( ).

The monotonicity of the ITM function is an important property. In some case, the use of the modified gain function Gbs( ) may prevent the ITM function to be monotonous. The loss of monotonicity may happen for very high value of the attenuation gain factor hlCoef and/or of γ, when the expanded target luminance value BSTarget is very low, or when the original ITM curve goes very high. Two different cases can happen: either the curve is not monotonic at the highest luminance values Y', either the curve loses monotonicity for some intermediate luminance values Y' and recovers it for higher luminance values Y'.

FIG. 13A shows a typical case where an ITM curve (in dashed line) is not monotonous.

In FIG. 13A, a first curve in continuous line represents an ITM curve without bright spot attenuation and a second curve in dashed line represents a result of an attenuation of the first curve resulting in a non-monotonous curve.

In this example, both hlCoef and γ, and especially γ, have very high values:

$$hlCoef = 0.07 \text{ and } \gamma = 12.$$

If hlCoefPos is equal to "255", which means that hlCoef has been computed at the luminance value Y'=255, the processing module 30 only needs to reduce γ to retrieve monotonicity (the value of Yexp' doesn't change when γ changes if Y'=255). For example, using γ=9, the expanded curve in dashed line is monotonic again.

FIG. 13B shows a correction of an ITM curve allowing insuring monotonicity of the ITM curve.

In FIG. 13B, the first curve is identical to the first curve of FIG. 13A. The curve in dashed line results of the modification of the parameter γ in the ITM function allowing obtaining the second curve in FIG. 13A.

If hlCoefPos≠255, then the processing module 30 needs to modify both hlCoef and γ to retrieve monotonicity while preserving the same Yexp' value at hlCoefPos. For example, if hlCoefPos=243, Yexp'=748, and then the processing module needs to reduce γ and hlCoef to retrieve monotonicity.

This can be done recursively. For example, hlCoef=0.063 and $\gamma$=9.8, the curve is monotonic again while Yexp' keeps the same value (Yexp'=748).

In an embodiment, the process of FIG. 9B is complemented by an optional step 452. During step 452, the monotonicity of the ITM curve obtained when using the bright spot attenuation is tested and a correction is applied to the ITM curve, if necessary, to ensure the monotonicity of the ITM curve.

FIG. 14 represents schematically a method allowing insuring the monotonicity of the ITM curve.

In a step 4521, the processing module 30 determines if the ITM curve obtained by introducing the modified gain function Gbs( ) in eq. 4 is monotonous. An ITM curve is monotonous if Yexp(k)≤Yexp(k+1) for any k between zero to "254".

If the ITM curve is monotonous, no correction is applied to the ITM function in a step 4525.

If the ITM function is not monotonous, the processing module 30 determines if hlCoefPos=255 in a step 4522. If yes, the processing module 30 modifies only $\gamma$. For example, $\gamma$ reduced recursively until the ITM function is monotonous.

If hlCoefPos≠255, the processing module 30 modifies hlCoef and $\gamma$ to ensure the monotonicity of the ITM curve while preserving the same expanded luminance value Yexp' at the luminance value Y'=hlCoefPos. This can be done by applying a recursive process reducing alternatively hlCoef and $\gamma$.

We described above a number of embodiments. Features of these embodiments can be provided alone or in any combination. Further, embodiments can include one or more of the following features, devices, or aspects, alone or in any combination, across various claim categories and types:

- A TV, set-top box, cell phone, tablet, or other electronic device that performs at least one of the embodiments described.
- A TV, set-top box, cell phone, tablet, or other electronic device that performs at least one of the embodiments described, and that displays (e.g. using a monitor, screen, or other type of display) a resulting image.
- A TV, set-top box, cell phone, tablet, or other electronic device that tunes (e.g. using a tuner) a channel to receive a signal including an encoded image or video stream, and performs at least one of the embodiments described.
- A TV, set-top box, cell phone, tablet, or other electronic device that receives (e.g. using an antenna) a signal over the air that includes an encoded image or video stream, and performs at least one of the embodiments described.

The invention claimed is:

1. A method for converting a current image in a standard dynamic range into an output image in a high dynamic range, the method comprising:

obtaining an initial gain function of a first inverse tone mapping function;

obtaining a target luminance value; and responsive to at least a pixel of the current image with a luminance value at least equal to the target luminance value having an expanded value resulting from an application of the first inverse tone mapping function to the current image higher than a target expanded luminance value, applying a second inverse tone mapping function to the current image to obtain the output image, the second inverse tone mapping function corresponding to the first inverse tone mapping function in which the gain function has been replaced by a modified gain function, the modified gain function being a function derived from the initial gain function in which a gain provided by the initial gain function is attenuated by an attenuation function, said attenuation function being an increasing function of luminance values weighted by a weighting factor controlling a strength of the attenuation, the weighting factor being determined by browsing a statistical distribution of luminance values in an histogram of the current image between a maximum luminance value and the target luminance value in descending order of luminance values from the maximum luminance value, computing an intermediate weighting factor for each browsed luminance value while the browsed luminance value is at least equal to the target luminance value and on a result of an application of the first inverse tone mapping function to the browsed luminance value is at least equal to the target expanded luminance value, and setting the value of the weighting factor to a value corresponding to a maximum of the computed intermediate weighting factor;

otherwise, applying the first inverse tone mapping function to the current image to obtain the output image.

2. The method of claim 1, wherein the intermediate weighting factor depends on an intermediate expanded target luminance value, and wherein the intermediate expanded target luminance value is computed as a weighted sum between the expanded target luminance value and the result of the application of the first inverse tone mapping function to the browsed luminance value, each weight of the weighted sum depending on a value representative of a proportion of pixels of the current image having a luminance value higher than the browsed luminance value.

3. The method of claim 2, wherein the value representative of the proportion of pixels of the current image having a luminance value higher than the browsed luminance value further depends on a maximum authorized expanded luminance value.

4. The method of claim 2, further comprising:

applying the first inverse tone mapping function to the current image when a quantity of pixels of the current image having a luminance value higher than the browsed luminance value is lower than a predefined minimum number of pixels.

5. The method of claim 1, wherein the current image belongs to a video sequence and the method comprises detecting scene cuts in the video sequence, the weighting factor controlling the strength of the attenuation depending also at least of one other weighting factor controlling the strength of the attenuation computed for another image of the video sequence preceding the current image, no scene cut having been detected between the current image and said another image.

6. The method of claim 1, further comprising:

verifying a monotonicity of a first inverse tone mapping curve obtained with the second inverse tone mapping function and modifying at least one parameter of the second inverse tone mapping function to obtain a monotonous second inverse tone mapping curve when the first inverse tone mapping curve is not monotonous.

7. The method of claim 1, wherein the target luminance value depends on a predetermined percentage of the pixels of the current image.

8. A device for converting a current image in a standard dynamic range into an output image in a high dynamic range, wherein the device comprises electronic circuitry adapted for:

obtaining an initial gain function of a first inverse tone mapping function;

obtaining a target luminance value; and responsive to at least a pixel of the current image with a luminance value at least equal to the target luminance value having an expanded luminance value resulting from an application of the first inverse tone mapping function to the current image higher than a target expanded luminance value, applying a second inverse tone mapping function to the current image to obtain the output image, the second inverse tone mapping function corresponding to the first inverse tone mapping function in which the gain function has been replaced by a modified gain function, the modified gain function being a function derived from the initial gain function in which a gain provided by the initial gain function is attenuated by an attenuation function, said attenuation function being an increasing function of luminance values weighted by a weighting factor controlling a strength of the attenuation, the weighting factor being determined by browsing a statistical distribution of luminance values in an histogram of the current image between a maximum luminance value and the target luminance value in descending order of luminance values from the maximum luminance value, computing an intermediate weighting factor for each browsed luminance value while the browsed luminance value is at least equal to the target luminance value and on a result of an application of the first inverse tone mapping function to the browsed luminance value is at least equal to the target expanded luminance value, and setting the value of the weighting factor to a value corresponding to a maximum of the computed intermediate weighting factor;

otherwise, applying the first inverse tone mapping function to the current image to obtain the output image.

9. The device of claim 8, wherein the intermediate weighting factor depends on an intermediate expanded target luminance value, and wherein the intermediate expanded target luminance value is computed as a weighted sum between the expanded target luminance value and the result of the application of the first inverse tone mapping function to the browsed luminance value, each weight of the weighted sum depending on a value representative of a proportion of pixels of the current image having a luminance value higher than the browsed luminance value.

10. The method of claim 9, wherein the value representative of the proportion of pixels of the current image having a luminance value higher than the browsed luminance value further depends on a maximum authorized expanded luminance value.

11. The device of claim 9, the electronic circuitry further adapted for:

applying the first inverse tone mapping function to the current image when a quantity of pixels of the current image having a luminance value higher than the browsed luminance value is lower than a predefined minimum number of pixels.

12. The device of claim 8, wherein the current image belongs to a video sequence and the electronic circuitry is also adapted for detecting scene cuts in the video sequence, the weighting factor controlling the strength of the attenuation depending also at least of one other weighting factor controlling the strength of the attenuation computed for another image of the video sequence preceding the current image, no scene cut having been detected between the current image and said another image.

13. The device of claim 8, the electronic circuitry further adapted for:

verifying a monotonicity of a first inverse tone mapping curve obtained with the second inverse tone mapping function and modifying at least one parameter of the second inverse tone mapping function to obtain a monotonous second inverse tone mapping curve when the first inverse tone mapping curve is not monotonous.

14. The device of claim 8, wherein the target luminance value depends on a predetermined percentage of the pixels of the current image.

15. An apparatus comprising the device of claim 8.

16. A non-transitory information storage medium storing program code instructions for implementing the method according to claim 1.

* * * * *